(12) United States Patent
Dinu et al.

(10) Patent No.: US 11,086,448 B2
(45) Date of Patent: Aug. 10, 2021

(54) PARALLEL ANALYSIS OF DIFFERENT SAMPLING RATES IN A TOUCH SCREEN CONTROLLER

(71) Applicant: STMicroelectronics Asia Pacific Pte Ltd, Singapore (SG)

(72) Inventors: Leonard Liviu Dinu, Singapore (SG); Hugo Gicquel, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 425 days.

(21) Appl. No.: 15/378,188

(22) Filed: Dec. 14, 2016

(65) Prior Publication Data

US 2018/0164948 A1 Jun. 14, 2018

(51) Int. Cl.
*G06F 3/044* (2006.01)
*G06F 3/041* (2006.01)

(52) U.S. Cl.
CPC ........ *G06F 3/04182* (2019.05); *G06F 3/0443* (2019.05)

(58) Field of Classification Search
CPC ....... G01D 5/24; G06F 1/0321; G06F 1/0328; G06F 1/0335; G06F 1/0342; G06F 1/06; G06F 1/08; G06F 1/041; G06F 1/044; G06F 1/045; G06F 1/047; G06F 2203/04111; G06F 2203/04112
See application file for complete search history.

(56) References Cited

U.S. PATENT DOCUMENTS 7,165,033 B1 * 1/2007 Liberman ............... G10L 17/26
    704/206
8,265,741 B2 * 9/2012 Whittington ......... A61B 5/0428
    600/508

(Continued)

FOREIGN PATENT DOCUMENTS

| CN | 1197555 A | 10/1998 |
|----|-----------|---------|
| CN | 102138121 A | 7/2011 |

(Continued)

OTHER PUBLICATIONS

First Office Action and Search Report for co-pending CN Appl. No. 201710377734.5 dated Aug. 4, 2020 (9 pages).

*Primary Examiner* — William Boddie
(74) *Attorney, Agent, or Firm* — Crowe & Dunlevy (57) ABSTRACT

A touch screen controller disclosed herein includes a circuit configured to generate a digital touch voltage comprises of samples, at a base sampling rate. The touch screen controller also includes a digital processing unit configured to analyze a first subset of samples of the digital touch voltage samples to determine noise content thereof, the first subset of samples corresponding to samples at a first investigated sampling rate that is a first function of the base sampling rate. The digital processing unit is also configured to analyze a second subset of samples of the digital touch voltage to determine noise content thereof, with the second subset of samples corresponding to samples at a second investigated sampling rate that is a second function of the base sampling rate, and determine a preferred sampling rate from among (Continued)

the first and second investigated sampling rates as a function of determined noise content thereof.

25 Claims, 5 Drawing Sheets

(56) References Cited

U.S. PATENT DOCUMENTS

| | | | |
|---|---|---|---|
| 2008/0212791 A1* | 9/2008 | Asada | G10K 11/178 |
| | | | 381/71.6 |
| 2011/0267296 A1* | 11/2011 | Noguchi | G06F 3/0412 |
| | | | 345/173 |
| 2014/0337647 A1* | 11/2014 | Jiang | G06F 1/324 |
| | | | 713/322 |
| 2016/0207204 A1* | 7/2016 | Teuscher | E04H 4/1654 |
| 2017/0176225 A1* | 6/2017 | Fontes | G01D 5/24 |
| 2017/0329456 A1* | 11/2017 | Leigh | G06F 3/0412 |

FOREIGN PATENT DOCUMENTS

| | | |
|---|---|---|
| CN | 102236465 A | 11/2011 |
| CN | 101257729 B | 8/2013 |
| CN | 105531654 A | 4/2016 |

* cited by examiner

PARALLEL ANALYSIS OF DIFFERENT SAMPLING RATES IN A TOUCH SCREEN CONTROLLER

TECHNICAL FIELD

This disclosure is related to the field of touch screen displays, and more particularly to the determination of a preferred touch sampling frequency through the parallel analysis of different sampling frequencies.

BACKGROUND

Handheld electronic devices such as smartphones, tablets, and smartwatches are popular with consumers and are sold in great numbers. The majority of these devices employ a touch sensitive display for both display of output to a user and accepting of data as input from a user. Most of these touch sensitive displays utilize capacitive touch sensing.

A typical such touch sensitive display includes a display layer constructed from technology such as LCD, IPS, or AMOLED, as well as a sensing layer. A typical sensing layer includes a plurality of parallel drive lines, and a plurality of parallel sense lines. The sense lines capacitively intersect the drive lines. In operation, a single drive line is driven with a wave, such as a square wave or sine wave having, for example, a period of 2.5 µs. The capacitance between the sense lines and the driven drive line is sensed at the point where they intersect. Presence of a human finger or a conductive object alters the expected capacitance at the intersection point, and by measuring the change in capacitance, a touch between the finger or object and the touch sensitive display can be detected.

Consumer desires for these handheld electronic devices are for the devices to grow increasingly thin. This accordingly results in the desire to make touch sensitive displays increasingly thin. However, as such touch sensitive displays grow thinner, noise from the display layer becomes an increasing problem for the sensing layer, as the thinner designs result in greater parasitic capacitances coupling the noise from the display layer through to the sensing layer. This noise, when coupled through to the sensing layer, degrades accuracy of the touch sensing performed by the sensing layer, which is commercially undesirable.

One way to help avoid noise in touch sensing is to sample touch output of the sensing layer at a sampling frequency at which the acquired samples are not subject to excessive noise. This is typically performed by frequency scanning and analysis during which multiple full sets of samples are each acquired at different sampling frequencies. That is, a first full set of samples is acquired at a first point in time at a first sampling frequency, and a second full set of samples is acquired at a second point in time at a second sampling frequency. These sets are separate and distinct, and are not subsets of a greater set, but are full complete sets on their own. The sampling frequency that yields less noise is then selected.

This process can be time consuming and resource intensive, however. Therefore, further development in the area of frequency scanning in touch sensing is needed.

SUMMARY

This summary is provided to introduce a selection of concepts that are further described below in the detailed description. This summary is not intended to identify key or essential features of the claimed subject.

A touch screen controller disclosed herein includes a circuit configured to generate a digital touch voltage comprises of samples, at a base sampling rate. The touch screen controller also includes a digital processing unit configured to analyze a first subset of samples of the digital touch voltage samples to determine noise content thereof, the first subset of samples corresponding to samples at a first investigated sampling rate that is a first function of the base sampling rate. The digital processing unit is also configured to analyze a second subset of samples of the digital touch voltage to determine noise content thereof, with the second subset of samples corresponding to samples at a second investigated sampling rate that is a second function of the base sampling rate, and determine a preferred sampling rate from among the first and second investigated sampling rates as a function of determined noise content thereof.

The circuit may include a charge to voltage converter to convert the touch signal to an analog touch voltage, and an analog to digital converter to sample the analog touch voltage to at the base sampling rate so as to generate the digital touch voltage comprised of the samples.

The first investigated sampling rate may be a first fraction of the base sampling rate, and the second investigated sampling rate may be a second fraction of the base sampling rate. The first and second investigated sampling rates may be unequal.

The digital processing unit may be further configured to apply a first plurality of filters to the first subset of samples, analyze filtered noise content of the first subset of samples as a function of the first plurality of filters, apply a second plurality of filters to the second subset of samples, and analyze filtered noise content of the second subset of samples as a function of the second plurality of filters. Where the preferred sampling rate is the first investigated sampling rate, the digital processing unit may determine a preferred filter from among the first plurality of filters as a function of the filtered noise content of the first subset of samples. Where the preferred sampling rate is the second investigated sampling rate, the digital processing unit may determine a preferred filter from among the second plurality of filters as a function of the filtered noise content of the second subset of samples.

The first plurality of filters may be first finite impulse response filters, and the second plurality of filters may be second finite impulse response filters. The first finite impulse response filters may have different coefficients than the second finite impulse response filters.

The digital processing unit may be further configured to apply a first plurality of filters to the first subset of samples, analyze filtered noise content of the first subset of samples as a function of the first plurality of filters, apply a second plurality of filters to the second subset of samples, and analyze filtered noise content of the second subset of samples as a function of the second plurality of filters. The preferred sampling rate may also be determined as a function of the filtered noise content of the first subset of samples and the filtered noise content of the second subset of samples.

The first plurality of filters may be first finite impulse response filters, and the second plurality of filters may be second finite impulse response filters. The first finite impulse response filters may have different coefficients than the second finite impulse response filters.

The preferred sampling rate may be determined based upon which from among the first and second investigated sampling rates has a lower determined noise content.

The digital processing unit may include first and second registers, and may be configured to sum the first subset of samples of the digital touch voltage and store that sum in the first register. The digital processing unit may sum the second subset of samples of the digital touch voltage and store that sum in the second register.

The analog to digital converter may sample in phase and quadrature components of the analog touch voltage to generate a digital touch voltage comprised of in phase and quadrature samples. In addition, the digital processing unit may be configured to analyze a first subset of in phase and quadrature samples of the digital touch voltage to determine noise content thereof, the first subset of in phase and quadrature samples corresponding to in phase and quadrature samples at a first investigated sampling rate. The digital processing unit may also analyze a second subset of in phase and quadrature samples of the digital touch voltage to determine noise content thereof, the second subset of in phase and quadrature samples corresponding to in phase and quadrature samples at a second investigated sampling rate. A preferred sampling rate may be determined from among the first and second investigated sampling rates as a function of determined noise content thereof.

The digital processing unit may determine the noise content of the first subset as a function of a sum of an absolute value of a sum of the in phase samples of the first subset and an absolute value of a sum of the quadrature samples of the first subset. The digital processing unit may determine the noise content of the second subset as a function of a sum of an absolute value of a sum of the in phase samples of the second subset and an absolute value of a sum of the quadrature samples of the second subset.

Also disclosed herein are method counterparts to the above. For example, a method may include acquiring a continuous analog touch voltage output by continuously performing capacitive touch sensing, sampling the continuous analog touch voltage to at a base sampling rate so as to generate a digital touch voltage comprised of samples, and analyzing a first subset of samples of the digital touch voltage to determine noise content thereof, the first subset of samples corresponding to samples at a first investigated sampling rate. The method may further include analyzing a second subset of samples of the digital touch voltage to determine noise content thereof, the second subset of samples corresponding to samples at a second investigated sampling rate, and determining a preferred sampling rate from among the first and second investigated sampling rates as a function of determined noise content thereof.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
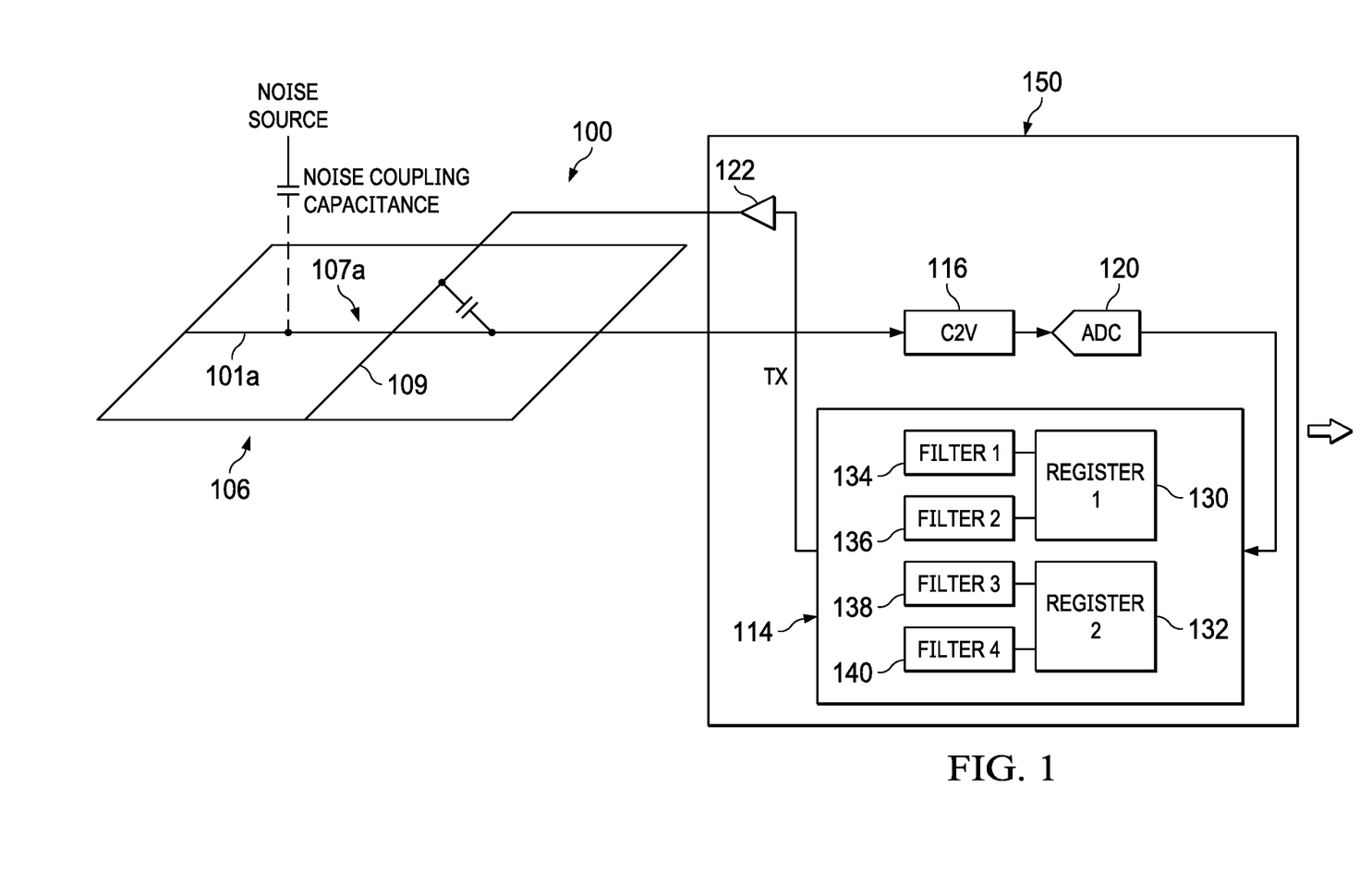
FIG. 1 is schematic block diagram of a touch screen in which external noise is coupled through to a plurality of sense lines, and in which the sampling techniques of this disclosure are performed.
Figure 2:
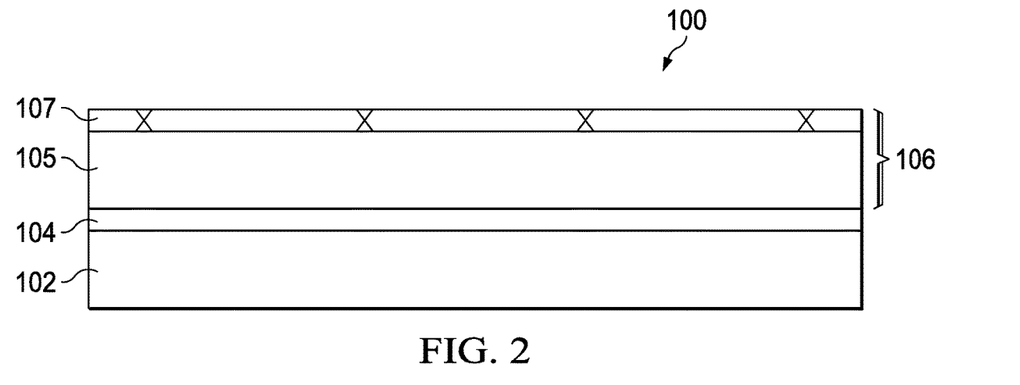
FIG. 2 is a schematic cross sectional diagram of the touch screen of FIG. 1 showing the arrangement of the display layer, VCOM layer, and sensing layer, as well as the parasitic capacitances coupling the external noise to the display layer.

With initial reference to FIGS. 1 and 2, a touch sensitive display 100 for an electronic device is now described. The electronic device may be a smartphone, smartwatch, tablet, laptop, or other suitable portable electronic device. The touch sensitive display 100 includes a display layer 102 with a common voltage layer (VCOM) 104 thereon. A touch sensing layer 106 is over the VCOM layer 104.

As best shown in FIG. 2, the touch sensing layer 106 is comprised of a touch layer substrate 105 having a touch sensor 107 formed thereon. The touch sensor 107 itself is formed by a capacitively intersecting sense line 101a and drive line 109. Although the singular sense line 101a is shown for simplicity, there may be any number of such sense lines 101a-101n. Although one drive line 109 is shown, there may also be any number of such drive lines.

A touch is detected via measuring the capacitance between the sense line 101a and the drive line 109. The VCOM layer 104 provides a common voltage to both the sensing layer 106 and the display layer 102. The common voltage is based upon a voltage reference Vcom. The display layer 102 contains rows and columns of pixels that are scanned so as to form an image for display to a user.

The touch screen controller 150 includes a driver 122 coupled to the drive line 109 and controlled by a drive (or "force") signal Tx from the digital block 114. The sense line 101a is coupled to a charge to voltage (C2V) converter 116. The charge to voltage converter 116 is coupled to an analog to digital converter (ADC) 120, which in turn is coupled to the digital block 114. The digital block 114 includes a first register 130 and second register 132.

Generation of the touch data will now be described. The drive line 109 is driven with a periodic signal by the driver 122, under control of the digital block 114. At the intersection point between the drive line 109 and sense line 101a, the sense line 101a incurs a charge injection proportional to the voltage at the drive line 109 and a capacitance between the sense line 101a and the drive line 109 at that intersection point. The charge to voltage converter 116 converts the charge injection to a voltage, which is then sampled by the analog to digital converter 120 at a sampling frequency Fs. This capacitance varies in proximity to conductive objects, such as human fingers, and is measured and processed by a touch screen controller (TSC) 150 so as to generate touch data for use by the electronic device.

The Inventors have found that external noise may be capacitively coupled to the sensing layer 106. This external noise may be noise due to off-chip sources, such as charger noise, fluorescent lamp noise, display noise, etc. This external noise is capacitively coupled to the touch sensor 107a, for example. This noise causes unwanted charge injection which would degrade the accuracy and performance of the touch data generated by the touch screen controller 150.

Figure 5:
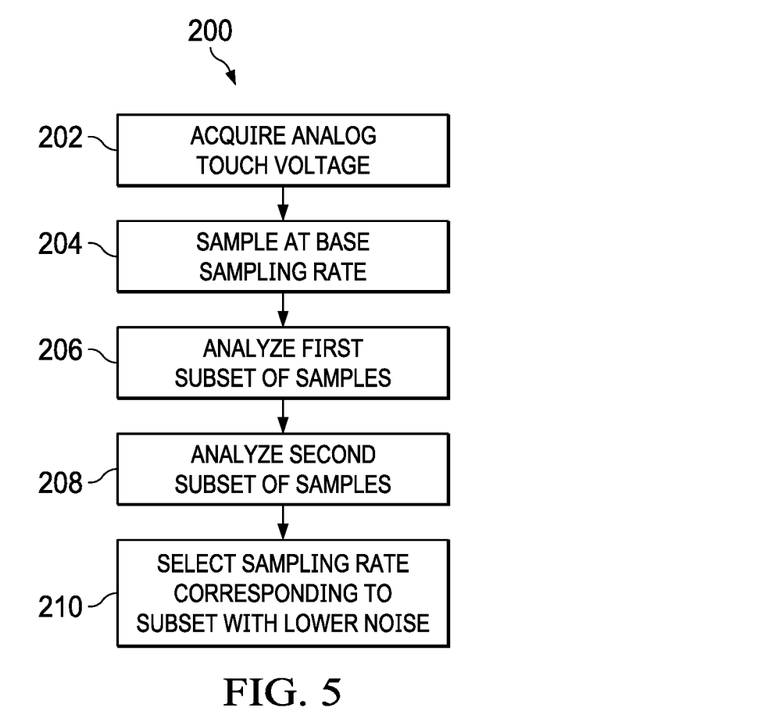
FIG. 5 is a flowchart of the technique for operating the device of FIG. 1 in accordance with this disclosure.

This noise may be greatest at certain harmonics. Therefore, it is desirable for the sampling frequency of the analog to digital converter 120 to be such that samples are not collected at those harmonics. So as to effectuate the finding of a preferred sampling frequency that avoids a sufficient amount or substantially all of the external noise, the touch sensitive display 100 is operated in a continuous time fashion. Thus, the charge to voltage converter 116, in continuous time, converts the injected charge to an output voltage (Block 202), which is converted to a digital voltage by the analog to digital converter 120 (Block 204).

The analog to digital converter 120 initially samples the output voltage from the charge to voltage converter 116 at a sampling rate Fs, which is very high, such as 20 to 60 times that of a typical sampling frequency for use in a touch sensitive display 100. The digital block 114 then, substantially simultaneously and in a parallel fashion, evaluates the noise from different potential sampling frequencies by looking at different subsets (Blocks 206, 208) of the samples generated by the analog to digital converter 10 at the high sampling rate Fs.

Figure 3:
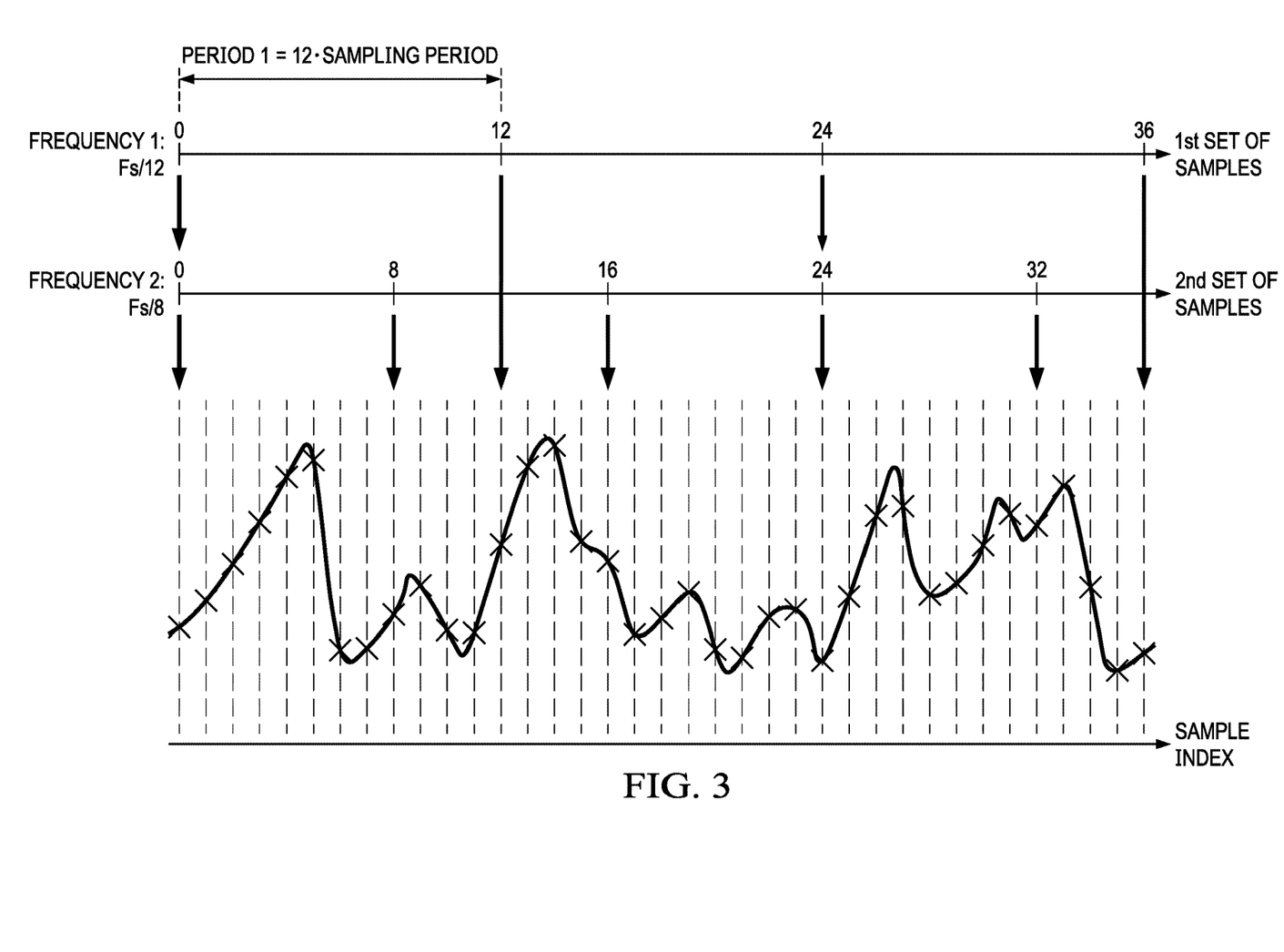
FIG. 3 is a graph showing the selection of samples of touch data at different sampling frequencies in accordance with this disclosure.

In greater detail with additional reference to FIG. 3, the digital block 114 may evaluate, estimate, and/or calculate the noise in the subset of the samples that is comprised of every Nth sample (for example, every $8^{th}$ sample). The digital block 114 may then evaluate, estimate, and/or calculate the noise in the subset of the samples that is comprised of every Ith sample (for example, every $12^{th}$ sample). The subset with the lower noise then corresponds to a preferred sampling rate (210). For example, where the subset of samples that is comprised of every Nth sample is lower in noise, then the preferred sampling rate is Fs/N. Alternatively, where the subset of samples that is comprises of every Ith sample is lower in noise, then the preferred sampling rate is Fs/I.

This may be performed by calculating, as each sample at the sampling rate Fs is taken, running sums of the values of the different subsets, and storing those running sums in the registers 130 and 132. Thus, in the example given above, the register 130 may store the sum of the Nth samples (i.e., where N is 8, the sum of the $0^{th}$ sample, $8^{th}$ sample, $16^{th}$ sample, etc), and the register 132 may store the sum of the Ith samples (i.e. where I is 12, the $0^{th}$ sample, $12^{th}$ sample, $24^{th}$ sample, etc). The lower sum indicates the sampling rate Fs/N or Fs/I with the lower noise, and thus, the preferred sampling rate. In some cases, the sums may be divided by the total number of Nth or Ith samples, and may instead thus be averages that are compared to one another.

It should be appreciated that the above is equally applicable to quadrature sampling. Thus, as shown in reference to FIG. 4, two sets of samples (an in phase set and a quadrature phase set, separated in phase by $\pi/4$) may be evaluated for each subset. For example, the first subset may include an in phase set of every Nth sample starting with the $0^{th}$ sample and a quadrature set of everything Nth sample starting with the $N/4^{th}$ sample. Where N is 8, the in phase set may include the $0^{th}$ sample, $8^{th}$ sample, $16^{th}$ sample, etc, and the quadrature set may include the $2^{nd}$ sample, $10^{th}$ sample, $18^{th}$ sample, etc.

Figure 4:
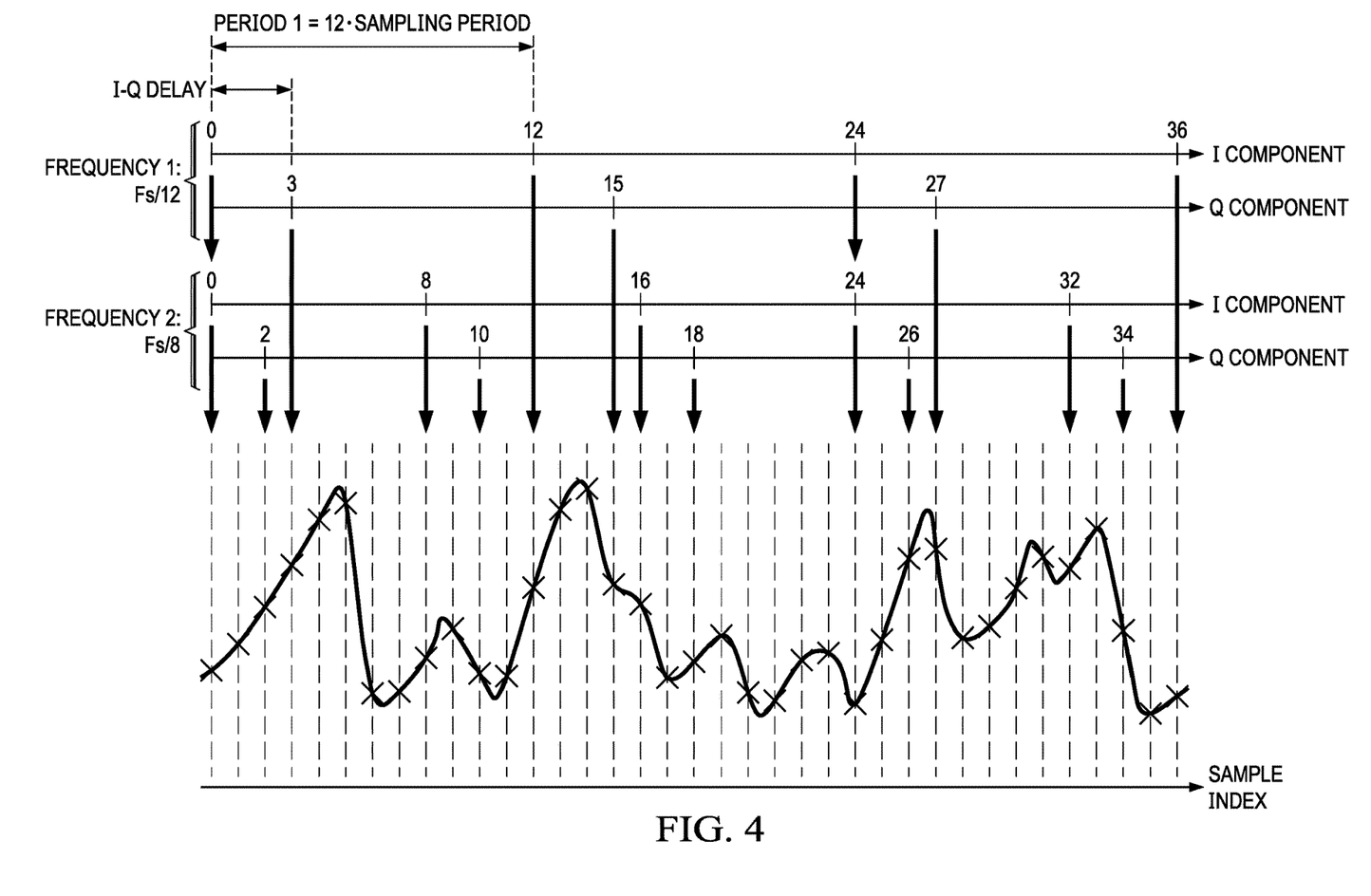
FIG. 4 is a graph showing the selection of in phase and quadrature samples of touch data at different sampling frequencies in accordance with this disclosure.

Similarly, the second subset may include an in phase set of every Ith sample starting with the $0^{th}$ sample and a quadrature set of everything Ith sample starting with the $I/4^{th}$ sample. Where I is 12, the in phase set may include the $0^{th}$ sample, $12^{th}$ sample, $24^{th}$ sample, etc, and the quadrature set may include the $3^{rd}$ sample, $15^{th}$ sample, $27^{th}$ sample, etc.

The amplitude of noise at a given frequency is $A=\sqrt{I^2+Q^2}$. Therefore, if the I samples are $i_0, i_{12}, i_{24}, \ldots$ and the Q samples are $q_3, q_{15}, q_{27} \ldots$ then the amplitude of the noise can be calculated as:

$$A=\text{average}(\sqrt{i_0^2+q_3^2}, \sqrt{i_{12}^2+q_{15}^2}, \sqrt{i_{24}^2+q_{27}^2})$$

Alternatively, an approximation may be used in which $A=|I|+|Q|$. Although this approximation may not be as accurate as the above calculation involving radicals, it may be quicker to calculate.

From the above, it is to be appreciated the noise at two different sampling frequencies is evaluated in parallel, since but one acquisition sweep at Fs is used to generate both subsets of data for analysis. It is also to be appreciated that although the above example shows the formation and evaluation of two subsets and thus two potential sampling frequencies, any number of subsets may be used and thus any number of potential sampling frequencies may be evaluated. Although two registers 130 and 132 are shown, any suitable number of registers may be present, such that there is one register per subset, for example.

In addition, the digital block 114 may apply multiple different filters to each subset so as to determine a preferred filter. For example, the digital block 114 may apply filters 134 and 136 to the subset stored in register 130, and may apply filters 138 and 140 to the subset stored in register 132.

The filters may be finite impulse response filters, and multiple different coefficients may be applied to each subset. The filter that provides for the greatest noise attenuation is the preferred filter for a given subset. Once the preferred filter is found for each subset, then the noise analysis may be performed for each filtered subset, so as to determine the preferred sampling frequency as well as the preferred sampling frequency. Alternatively, the preferred sampling frequency may first be determined, and then different filters may be applied to the subset corresponding to that preferred sampling frequency so as to determine the preferred filter.

The methods, techniques, and devices described above improve the functionality of touch screen panels themselves by improving the accuracy of their capabilities. Thus, touch screen technology itself is improved through the use and implementation of the above.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A touch screen controller, comprising:
a circuit configured to sample an output voltage at a base sampling rate to generate digital touch voltage samples;
a digital processing unit configured to:
analyze a first subset of non-contiguous samples of the digital touch voltage samples to determine noise content thereof, wherein the first subset of non-contiguous samples of the digital touch voltage samples represent samples of the output voltage that would have been produced if the output voltage had been sampled at a first investigated sampling rate that is a first function of the base sampling rate;
analyze a second subset of non-contiguous samples of the digital touch voltage samples to determine noise content thereof, wherein the second subset of non-contiguous samples of the digital touch voltage samples represent samples of the output voltage that would have been produced if the output voltage had been sampled at a second investigated sampling rate that is a second function of the base sampling rate;
wherein the analyzing of the first subset of non-contiguous samples and the analyzing of the second subset of non-contiguous samples by the digital processing unit is performed by the digital processing unit in parallel; and determine a preferred sampling rate from among the first and second investigated sampling rates as a function of determined noise content thereof.

2. The touch screen controller of claim 1, wherein the circuit comprises:
a charge to voltage converter configured to convert a touch signal to an analog touch voltage; and
an analog to digital converter configured to sample the analog touch voltage at the base sampling rate so as to generate the digital touch voltage samples.

3. The touch screen controller of claim 1, wherein the first investigated sampling rate is a first fraction of the base sampling rate; wherein the second investigated sampling rate is a second fraction of the base sampling rate.

4. The touch screen controller of claim 3, wherein the first and second investigated sampling rates are unequal.

5. The touch screen controller of claim 1, wherein the digital processing unit is further configured to:
apply a first plurality of filters to the first subset of non-contiguous samples;
analyze filtered noise content of the first subset of non-contiguous samples as a function of the first plurality of filters;
apply a second plurality of filters to the second subset of non-contiguous samples;
analyze filtered noise content of the second subset of non-contiguous samples as a function of the second plurality of filters;
if the preferred sampling rate is the first investigated sampling rate, then determine a preferred filter from among the first plurality of filters as a function of the filtered noise content of the first subset of non-contiguous samples; and
if the preferred sampling rate is the second investigated sampling rate, then determine a preferred filter from among the second plurality of filters as a function of the filtered noise content of the second subset of non-contiguous samples.

6. The touch screen controller of claim 5, wherein the first plurality of filters are first finite impulse response filters; wherein the second plurality of filters are second finite impulse response filters; and wherein the first finite impulse response filters have different coefficients than the second finite impulse response filters.

7. The touch screen controller of claim 1, wherein the digital processing unit is further configured to:
apply a first plurality of filters to the first subset of non-contiguous samples;
analyze filtered noise content of the first subset of non-contiguous samples as a function of the first plurality of filters;
apply a second plurality of filters to the second subset of non-contiguous samples;
analyze filtered noise content of the second subset of non-contiguous samples as a function of the second plurality of filters; and
wherein the preferred sampling rate is also determined as a function of the filtered noise content of the first subset of non-contiguous samples and the filtered noise content of the second subset of non-contiguous samples.

8. The touch screen controller of claim 7, wherein the first plurality of filters are first finite impulse response filters; wherein the second plurality of filters are second finite impulse response filters; and wherein the first finite impulse response filters have different coefficients than the second finite impulse response filters.

9. The touch screen controller of claim 1, wherein the preferred sampling rate is determined based upon which from among the first and second investigated sampling rates has a lower determined noise content.

10. The touch screen controller of claim 1, wherein the digital processing unit includes first and second registers; wherein the digital processing unit is configured to sum the first subset of non-contiguous samples of the digital touch voltage and store that sum in the first register; and wherein the digital processing unit is configured to sum the second subset of non-contiguous samples of the digital touch voltage and store that sum in the second register.

11. The touch screen controller of claim 2, wherein the analog to digital converter samples the analog touch voltage by sampling in phase and quadrature components of the analog touch voltage at the base sampling rate to generate the digital touch voltage samples as being comprised of in phase and quadrature samples; and wherein the digital processing unit i:
analyzes the first subset of non-contiguous samples by analyzing a first subset of non-contiguous in phase and quadrature samples of the digital touch voltage samples to determine noise content thereof, wherein the first subset of non-contiguous in phase and quadrature samples represent in phase and quadrature samples of the analog touch voltage that would have been produced if the analog touch voltage had been sampled at the first investigated sampling rate; and
analyzes the second subset of non-contiguous samples by analyzing a second subset of non-contiguous in phase and quadrature samples of the digital touch voltage samples to determine noise content thereof, wherein the second subset of non-contiguous in phase and quadrature samples represent in phase and quadrature samples of the analog touch voltage that would have been produced if the analog touch voltage had been sampled at the second investigated sampling rate.

12. The touch screen controller of claim 11, wherein the digital processing unit determines the noise content of the first subset as a function of a sum of an absolute value of a sum of the in phase samples of the first subset and an absolute value of a sum of the quadrature samples of the first subset; and wherein the digital processing unit determines the noise content of the second subset as a function of a sum of an absolute value of a sum of the in phase samples of the second subset and an absolute value of a sum of the quadrature samples of the second sub set.

13. An electronic device, comprising:
a circuit to sample a received analog touch voltage to at a base sampling rate Fs so as to generate a series of digital touch voltage samples;
a digital processing unit configured to:
analyze every Nth sample of the series of digital touch voltage samples sampled at the base sampling rate of Fs to determine noise content of a first subset of samples, wherein the first subset of samples represent samples of the analog touch voltage that would have been produced if the analog touch voltage had been sampled at a sampling rate of Fs/N;
analyze every Ith sample of the series of digital touch voltage samples sampled at the base sampling rate of Fs to determine noise content of a second subset of samples, wherein the second subset of samples represent samples of the analog touch voltage that would have been produced if the analog touch voltage had been sampled at a sampling rate of Fs/I;
determine Fs/N to be a preferred sampling rate as a function of the noise content of the first subset of samples being less than the noise content of the second subset of samples; and
determine Fs/I to be the preferred sampling rate as a function of the noise content of the second subset of samples being less than the noise content of the first subset of samples;
wherein the analysis of every Nth sample of the series of digital touch voltage samples sampled at the base sampling rate of Fs, and the analysis of every Ith sample of the series of digital touch voltage samples sampled at the base sampling rate of Fs, is performed substantially simultaneously in parallel.

14. The electronic device of claim 13, wherein the digital processing unit is further configured to:
apply a first plurality of filters to the first subset of samples;
analyze filtered noise content of the first subset of samples as a function of the first plurality of filters;
apply a second plurality of filters to the second subset of samples;
analyze filtered noise content of the second subset of samples as a function of the second plurality of filters;
where the preferred sampling rate is Fs/N, determine a preferred filter from among the first plurality of filters as a function of the filtered noise content of the first subset of samples; and
where the preferred sampling rate is Fs/I, determine a preferred filter from among the second plurality of filters as a function of the filtered noise content of the second subset of samples.

15. The electronic device of claim 14, wherein the first plurality of filters are first finite impulse response filters; wherein the second plurality of filters are second finite impulse response filters; and wherein the first finite impulse response filters have different coefficients than the second finite impulse response filters.

16. The electronic device of claim 13, wherein the digital processing unit is further configured to:
apply a first plurality of filters to the first subset of samples;
analyze filtered noise content of the first subset of samples as a function of the first plurality of filters;
apply a second plurality of filters to the second subset of samples; and
analyze filtered noise content of the second subset of samples as a function of the second plurality of filters;
wherein whether Fs/N is determined to be the preferred sampling rate is also determined as a function of the filtered noise content of the first subset of samples;
wherein whether Fs/I is determined to be the preferred sampling rate is also determined as a function of the filtered noise content of the second subset of samples.

17. The electronic device of claim 16, wherein the first plurality of filters are first finite impulse response filters; wherein the second plurality of filters are second finite impulse response filters; and wherein the first finite impulse response filters have different coefficients than the second finite impulse response filters.

18. A method, comprising:
acquiring a continuous analog touch voltage output by continuously performing capacitive touch sensing;
sampling the continuous analog touch voltage at a base sampling rate so as to generate digital touch voltage samples;
analyzing a first subset of non-contiguous samples of the digital touch voltage to determine noise content thereof, wherein the first subset of non-contiguous samples represent samples of the continuous analog touch voltage that would have been produced if the continuous analog touch voltage had been sampled at a first investigated sampling rate;
analyzing a second subset of non-contiguous samples of the digital touch voltage to determine noise content thereof, wherein the second subset of non-contiguous samples represent samples of the continuous analog touch voltage that would have been produced if the continuous analog touch voltage had been sampled at a second investigated sampling rate;
wherein the analyzing of the first subset of non-contiguous samples and the analyzing of the second subset of non-contiguous samples is performed in parallel; and
determining a preferred sampling rate from among the first and second investigated sampling rates as a function of determined noise content thereof.

19. The method of claim 18, wherein the first investigated sampling rate is a first fraction of the base sampling rate; wherein the second investigated sampling rate is a second fraction of the base sampling rate.

20. The method of claim 19, wherein the first and second investigated sampling rates are unequal.

21. The method of claim 18, further comprising:
applying a first plurality of filters to the first subset of non-contiguous samples;
analyzing filtered noise content of the first subset of non-contiguous samples as a function of the first plurality of filters;
applying a second plurality of filters to the second subset of non-contiguous samples;
analyzing filtered noise content of the second subset of non-contiguous samples as a function of the second plurality of filters;
if the preferred sampling rate is the first investigated sampling rate, then determining a preferred filter from among the first plurality of filters as a function of the filtered noise content of the first subset of non-contiguous samples; and
if the preferred sampling rate is the second investigated sampling rate, then determining a preferred filter from among the second plurality of filters as a function of the filtered noise content of the second subset of non-contiguous samples.

22. The method of claim 21, wherein the first plurality of filters are first finite impulse response filters; wherein the second plurality of filters are second finite impulse response filters; and wherein the first finite impulse response filters have different coefficients than the second finite impulse response filters.

23. The method of claim 18, further comprising:
applying a first plurality of filters to the first subset of non-contiguous samples;
analyzing filtered noise content of the first subset of non-contiguous samples as a function of the first plurality of filters;
applying a second plurality of filters to the second subset of non-contiguous samples;
analyzing filtered noise content of the second subset of non-contiguous samples as a function of the second plurality of filters; and wherein the preferred sampling rate is also determined as a function of the filtered noise content of the first subset of non-contiguous samples and the filtered noise content of the second subset of non-contiguous samples.

24. The method of claim 23, wherein the first plurality of filters are first finite impulse response filters; wherein the second plurality of filters are second finite impulse response filters; and wherein the first finite impulse response filters have different coefficients than the second finite impulse response filters.

25. The method of claim 18, wherein the preferred sampling rate is determined based upon which from among the first and second investigated sampling rates has a lower determined noise content.

* * * * *